(12) United States Patent
Sasada

(10) Patent No.: US 7,920,237 B2
(45) Date of Patent: Apr. 5, 2011

(54) TRANSPARENT POLYMER FILM AND METHOD FOR PRODUCING IT, AND RETARDATION FILM, POLARIZER AND LIQUID CRYSTAL DISPLAY DEVICE COMPRISING THE FILM

(75) Inventor: Yasuyuki Sasada, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 303 days.

(21) Appl. No.: 11/990,448

(22) PCT Filed: Aug. 22, 2006

(86) PCT No.: PCT/JP2006/316807
§ 371 (c)(1),
(2), (4) Date: Feb. 14, 2008

(87) PCT Pub. No.: WO2007/023988
PCT Pub. Date: Mar. 1, 2007

(65) Prior Publication Data
US 2009/0244453 A1 Oct. 1, 2009

(30) Foreign Application Priority Data
Aug. 22, 2005 (JP) .................................. 2005-239700

(51) Int. Cl.
*G02F 1/1335* (2006.01)

(52) U.S. Cl. ...................................................... 349/117
(58) Field of Classification Search ........................ None
See application file for complete search history.

(56) References Cited

U.S. PATENT DOCUMENTS

| 2009/0086320 A1* | 4/2009 | Yoshihara et al. | 359/493 |
| 2009/0091694 A1* | 4/2009 | Sasada | 349/117 |
| 2009/0153965 A1* | 6/2009 | Ito et al. | 359/500 |

FOREIGN PATENT DOCUMENTS

| JP | 05-157911 A | 6/1993 |
| JP | 06-331826 A | 12/1994 |
| JP | 2000-231016 | 8/2000 |
| JP | 2005-120352 A | 5/2005 |

OTHER PUBLICATIONS

Notification Concerning Transmittal of International Preliminary Report on Patentability (IPRP) (Form PCT/IB/326), International Preliminary Report on Patentability (Form PCT/IB/373), Written Opinion of the International Searching Authority (Form PCT/ISA/237) mailed Oct. 10, 2006.

* cited by examiner

*Primary Examiner* — Sung H Pak
(74) *Attorney, Agent, or Firm* — Buchanan Ingersoll & Rooney PC

(57) ABSTRACT

A transparent polymer film satisfying $Re \geqq 15$ and $Rth \leqq -7.5$, and having a moisture permeability at 40° C. and a relative humidity of 90% of at least 100 g/(m²·day) as calculated in terms of the film having a thickness of 80 μm. This film can be stuck to a polarizing film in on-line operation.

14 Claims, No Drawings

TRANSPARENT POLYMER FILM AND METHOD FOR PRODUCING IT, AND RETARDATION FILM, POLARIZER AND LIQUID CRYSTAL DISPLAY DEVICE COMPRISING THE FILM

TECHNICAL FIELD

The present invention relates to a transparent polymer film having optical anisotropy and capable of being directly stuck to a polarizing film, and a method for producing it, and to provide a retardation film, a polarizer and a liquid crystal display device comprising the transparent polymer film.

BACKGROUND ART

A polymer film of typically cellulose ester, polyester, polycarbonate, cyclo-olefin polymer, vinyl polymer or polyimide is used in silver halide photographic materials, retardation films, polarizers and image display devices. Films that are more excellent in point of the surface smoothness and the uniformity can be produced from these polymers, and the polymers are therefore widely employed for optical films.

Of those, cellulose ester films having suitable moisture permeability can be directly stuck to most popular polarizing films formed of polyvinyl alcohol (PVA)/iodine in on-line operation. Accordingly, cellulose acylate, especially cellulose acetate is widely employed as a protective film for polarizers.

On the other hand, when transparent polymer films are applied to optical use, for example, in retardation films, supports for retardation films, protective films for polarizers and liquid crystal display devices, the control of their optical anisotropy is an extremely important element in determining the performance (e.g., visibility) of display devices. With the recent demand for broadening the viewing angle of liquid crystal display devices, improvement of retardation compensation in the devices is desired, for which it is desired to suitably control the in-plane retardation Re (this may be simply referred to as Re) and the thickness-direction retardation Rth (this may be simply referred to as Rth) of the retardation film to be disposed between a polarizing film and a liquid crystal cell. In particular, since transparent polymer films having a negative Rth are not easy to produce, and it is desired to produce them in a simplified manner.

For producing transparent polymer films having a negative Rth, disclosed is a method of forming a vertically-aligned liquid crystal layer on an isotropic transparent polymer film serving as a support (e.g., see JP-A-6-331826), but the method is problematic in that the production process according to it is complicated and that the producibility is lowered owing to the retardation fluctuation caused by the non-uniformity of the alignment and the film thickness.

For producing transparent polymer films having a negative Rth, also disclosed is a continuous production method comprising sticking a thermal-shrinking film to a transparent polymer film, then thermally stretching it and thereafter peeling the thermal-shrinking film (e.g., see JP-A-5-157911 and JP-A-2000-231016). Examples in these references show that the polycarbonate films produced according to the method have a negative Rth. However, the method is problematic in that it consumes a large quantity of a thermal-shrinking film and that the quality (e.g., retardation value, slow axis direction) of the produced films is not uniform. The problems are especially serious with polymers of high elasticity such as cellulose esters and hydrophilic polymers.

For producing transparent polymer films having a negative Rth, also disclosed is a method of using a cellulose ester film having a high substitution degree of acetyl group (e.g., see JP-A-2005-120352). According to the method, films having suitable moisture permeability can be obtained, but the method is problematic in that the energy necessary for polymer dissolution is large and that the produced films could not have a sufficient Re.

DISCLOSURE OF THE INVENTION

An object of the invention is to provide a transparent polymer film which has suitable moisture permeability and has a large Re and a negative Rth and of which the fluctuation in the retardation value and the slow axis direction is small, and to provide a method for producing the film. Another object of the invention is to provide a retardation film that comprises the transparent polymer film of the invention, and to provide a polarizer fabricated by directly sticking the transparent polymer film of the invention to a polarizing film, as a retardation film, a support of a retardation film or a protective film of a polarizer, and therefore capable of exhibiting excellent optical properties. Still another object of the invention is to provide a liquid crystal display device of high reliability that comprises the film or the polarizer.

The problems can be solved by the following means:

(1) A transparent polymer film satisfying the following formulae (I) and (II) and having a moisture permeability at 40° C. and a relative humidity of 90% of at least 100 g/(m²·day) as calculated in terms of the film having a thickness of 80 μm:

$$Re \geq 15 \quad (I)$$

$$Rth \leq -7.5 \quad (II)$$

wherein Re and Rth each indicates the in-plane and thickness-direction retardation (unit: nm), respectively, at a wavelength of 632.8 nm.

(2) The transparent polymer film of (1), which has a thickness of from 20 μm to 180 μm.

(3) The transparent polymer film of (1) or (2), which has a single-layered structure.

(4) The transparent polymer film of any one of (1) to (3), which has a haze of at most 3%.

(5) The transparent polymer film of any one of (1) to (4), wherein the polymer comprises cellulose acylate as a main component.

(6) The transparent polymer film of (5), wherein the cellulose acylate is cellulose acetate.

(7) A retardation film comprising at least one transparent polymer film of any one of (1) to (6).

(8) The retardation film of (7), wherein Re≧30 nm and |Rth|≦15 nm.

(9) A polarizer comprising at least one transparent polymer film of any one of (1) to (6) and/or the retardation film of (7) or (8).

(10) The polarizer of (9), wherein the transparent polymer film is directly stuck to a polarizing film.

(11) A liquid crystal display device comprising at least one of the transparent polymer film of any one of (1) to (6), the retardation film of (7) or (8), or the polarizer of (9) or (10).

(12) The liquid crystal display device of (10), wherein the display mode is a VA mode or an IPS mode.

(13) A method for producing a transparent polymer film, which comprises transporting a transparent polymer film having a moisture permeability at 40° C. and a relative humidity of 90% of at least 100 g/(m²·day) as calculated in terms of the film having a thickness of 80 μm, and heating it at (Tg+60)° C. or higher wherein Tg is a glass transition temperature of the polymer film.

(14) A method for producing a transparent polymer film, which comprises transporting a cellulose acylate film and heating it at 200° C. or higher.

(15) The method for producing a transparent polymer film of (13) or (14), wherein the cellulose acylate film is stretched during the heating.

(16) The method for producing a transparent polymer film of (15), wherein the stretching is machine-direction stretching to be attained in an apparatus having a heating zone between at least 2 nip rolls.

(17) The method for producing a transparent polymer film of any one of (13) to (16), wherein the positivity/negativity of the birefringence of the film is reversed before and after the heat treatment.

The invention provides a transparent polymer film which has suitable moisture permeability and has a large Re and a negative Rth and of which the fluctuation in the retardation value and the slow axis direction is small, and a method for producing it, therefore providing an excellent retardation film. Since the transparent polymer film of the invention has suitable moisture permeability, it can be stuck to a polarizing film in on-line operation, therefore providing a polarizer of good visibility at high producibility. Further, the invention provides a liquid crystal display device of high reliability.

BEST MODE FOR CARRYING OUT THE INVENTION

The transparent polymer film of the invention, its production method, and the retardation film, the polarizer and the liquid crystal display device of the invention are described in detail hereunder. The description of the constitutive elements of the invention given hereunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

<<Transparent Polymer Film>>

The transparent polymer film of the invention is characterized in that it satisfies the following formulae (I) and (II) and has a moisture permeability at 40° C. and a relative humidity of 90% of at least 100 g/(m²·day) as calculated in terms of the film having a thickness of 80 μm:

$$Re \geq 15 \tag{I}$$

$$Rth \leq -7.5 \tag{II}$$

wherein Re and Rth each indicates the in-plane and thickness-direction retardation (unit: nm), respectively, at a wavelength of 632.8 nm.

[Retardation]

The retardation in the invention is described. In this description, Re and Rth (unit: nm) and the in-plane slow axis direction (hereinafter this may be abbreviated simply to "slow axis direction") are obtained according to the following method. A film to be analyzed is conditioned at 25° C. and a relative humidity of 60% for 24 hours. Using a prism coupler (Model 2010 Prism Coupler, by Metricon) and using a He—Ne laser at 632.8 nm, the mean refractivity (n) of the film, which is represented by the following formula (a), is obtained at 25° C. and a relative humidity of 60%.

$$n = (n_{TE} \times 2 + n_{TM})/3 \tag{a}$$

wherein $n_{TE}$ is the refractive index measured with polarizing light in the in-plane direction of the film; and $n_{TM}$ is the refractive index measured with polarizing light in the normal direction to the face of the film.

Next, using a birefringence meter (ABR-10A, by Uniopt) and using a He—Ne laser at 632.8 nm, the retardation of the conditioned film is determined at 25° C. and a relative humidity of 60% both in the vertical direction relative to the film surface and in the direction inclined by ±40° from the normal line to the film face relative to the slow axis direction in the film as the inclination axis (rotation axis). Regarding the retardation value (Re) observed in the inclined direction, the determined retardation value (Re) in that direction may be a negative value, as the case may be, since the direction that is the same as the in-plane slow axis direction is defined as the direction of nx. Then, using the mean refractive index obtained in the above, nx, ny and nz are computed. According to the following formulae (b) and (c), the in-plane retardation (Re) and the thickness-direction retardation (Rth) of the film are computed:

$$Re = (nx - ny) \times d \tag{b}$$

$$Rth = \{(nx + ny)/2 - nd\} \times d \tag{c}$$

wherein nx is the refractive index in the slow axis (x) direction of the film face; ny is the refractive index in the direction perpendicular to the direction x of the film face; nz is the refractive index in the thickness direction of the film (in the normal direction of the film face); d is the thickness (nm) of the film; and the slow axis is in the direction in which the refractive index is the largest in the film face.

The retardation of the transparent polymer film of the invention satisfies the above-mentioned formulae (I) and (II). Preferably, the transparent polymer film of the invention that satisfies the formulae (I) and (II) satisfies the following formulae (Ia) and (IIa):

$$20 \leq Re \leq 600 \tag{Ia}$$

$$-300 \leq Rth \leq -10. \tag{IIa}$$

More preferably, the transparent polymer film of the invention satisfies the following formulae (Ib) and (IIb):

$$30 \leq Re \leq 400 \tag{Ib}$$

$$-200 \leq Rth \leq -15. \tag{IIb}$$

Most preferably, the transparent polymer film of the invention satisfies the following formulae (Ic) and (IIc):

$$40 \leq Re \leq 300 \tag{Ic}$$

$$-150 \leq Rth \leq -20. \tag{IIc}$$

Preferably in the invention, the angle between the machine direction and the in-plane slow axis of the film is 0±10° or 90±10°, more preferably 0±5° or 90±5°, even more preferably 0±3° or 90±3°, as the case may be, still more preferably 0±1° or 90±1°, most preferably 90±1°.

Of the transparent polymer film of the invention, the fluctuation in the retardation value and the fluctuation in the slow axis direction may be represented by the difference between the maximum value and the minimum value at five points (center part, two edges (each at a position of 5% of the overall width from each edge), and two intermediates between the center part and each edge) in the cross direction of the film and at three points (at intervals of 50 m) in the machine direction thereof, as tested according to the above-mentioned method.

Preferably, the retardation fluctuation is as follows: Re is within ±5 nm, and Rth is within ±10 nm. More preferably, Re is within ±3 nm, and Rth is within ±5 nm; even more preferably, Re is within ±1 nm, and Rth is within ±2 nm.

Also preferably, the slow axis direction fluctuation range is less than 5°, more preferably less than 2°. Satisfying the conditions is favorable as bringing about the advantage that the display unevenness (brightness unevenness, color unevenness) of liquid crystal display devices can be reduced.

The retardation of the film of the invention may also be determined according to the following method.

First, the film is conditioned at 25° C. and at a relative humidity of 60% for 24 hours. Then, using a prism coupler (MODEL 2010 Prism Coupler, by Metricon) and using a 532-nm solid laser, the mean refractive index (n) of the film is measured at 25° C. and at a relative humidity of 60%, according to the following formula (a):

$$n = (n_{TE} \times 2 + n_{TM})/3 \tag{a}$$

wherein $n_{TE}$ indicates the refractive index of the film, as measured with polarizing light in the in-plane direction of the film; $n_{TM}$ indicates the refractive index of the film, as measured with polarizing light in the normal direction of the film plane.

In this description, Re(λ) and Rth(λ) each indicates an in-plane retardation and a thickness-direction retardation, respectively, at a wavelength λ of a film. Re(λ) is measured by applying light having a wavelength of λ nm to a film in the normal direction thereof, using KOBRA 21ADH or WR (by Oji Scientific Instruments).

When the film to be analyzed is one represented by a monoaxial or biaxial index ellipsoid, then its Rth(λ) may be calculated according to the following method.

Re(λ) is first determined as follows: The in-plane slow axis (judged by KOBRA 21ADH or WR) is taken as an inclination axis (rotation axis) of the film (in case where the film does not have a slow axis, then any in-plane direction of the film may be the rotation axis thereof). Light having a wavelength of λ nm is applied to the film in different inclination directions relative to the normal direction of the film, at intervals of 10 degrees up to 50 degrees on each side from the normal direction, and 11 points in all are analyzed. Based on the thus-measured retardation data, the mean refractive index and the inputted thickness of the film, Rth(λ) is computed by KOBRA 21ADH or WR.

In the above, in case where the film has a direction at a certain inclination angle from the normal direction around the in-plane slow axis as the rotation angle, in which its retardation is zero, then the retardation value of the film is changed to a negative one at an inclination angle larger than that inclination angle, and then Rth(λ) is computed by KOBRA 21ADH or WR.

Rth may also be calculated as follows: The slow axis of the film to be analyzed is taken as an inclination angle (rotation angle) thereof (in case where the film does not have a slow axis, then any in-plane direction of the film may be the rotation axis thereof). The retardation of the film is measured in any inclined two directions. Based on the data and the mean refractive index and the inputted thickness of the film, Rth may be calculated according to the following formulae (b) and (c):

(b):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

wherein Re(θ) indicates the retardation in the direction inclined by an angle θ from the normal direction of the film; nx indicates the in-plane refractive index of the film in the slow axis direction; ny indicates the in-plane refractive index of the film in the direction perpendicular to nx; nz indicates the refractive index of the film in the direction perpendicular to nx and ny.

$$Rth = ((nx + ny)/2 - nz) \times d \tag{c}$$

In case where the film to be analyzed could not be expressed as a monoaxial or biaxial index ellipsoid, or that is, when the film does not have an optical axis, then its Rth(λ) may be calculated as follows:

Re(λ) is first determined. The in-plane slow axis (judged by KOBRA 21ADH or WR) is taken as an inclination axis (rotation axis) of the film. Light having a wavelength of λ nm is applied to the film in different inclination directions relative to the normal direction of the film, at intervals of 10 degrees between −50 degrees and 50 degrees from the normal direction, and 11 points in all are analyzed. Based on the thus-measured retardation data, the mean refractive index and the inputted thickness of the film, Rth(λ) is computed by KOBRA 21ADH or WR.

These mean refractive index and film thickness data are inputted therein, and KOBRA 21ADH or WR computes nx, ny and nz. The thus-computed data nx, ny and nz give Nz=(nx−nz)/(nx−ny).

[Film Thickness]

Preferably, the thickness of the transparent polymer film of the invention is from 20 μm to 180 μm, more preferably from 40 μm to 160 μm, even more preferably from 60 μm to 140 μm. If the film thickness is smaller than 20 μm, then the handlability of the film in working it into polarizers may be poor and the resulting polarizers may unfavorably curl. The thickness fluctuation of the transparent polymer film of the invention is preferably from 0% to 2%, more preferably from 0% to 1.5%, even more preferably from 0% to 1% both in the machine direction and in the cross direction.

[Moisture Permeability]

The moisture permeability is described. In the invention, the "moisture permeability" is a value as determined as follows: A cup with calcium chloride put therein is covered and sealed up with a film sample to be analyzed, and this is left under a condition of 40° C. and a relative humidity of 90% for 24 hours. Before and after the conditioning test, the mass change of the sample (g/(m²·day)) is determined, from which the moisture permeability of the film is derived.

The moisture permeability increases with the increase in the ambient temperature and with the increase in the ambient humidity, but independently of the condition, the relative moisture permeability of different films does not change. Therefore, in the invention, the mass change value at 40° C. and a relative humidity of 90% of the film is taken as the standard for the moisture permeability thereof. On the other hand, the moisture permeability reduces with the increase in the film thickness and increases with the reduction in the film thickness. Accordingly, the measured moisture permeability is multiplied by the measured film thickness, then divided by 80, and the resulting value is the "moisture permeability as calculated in terms of the film having a thickness of 80 μm" as referred to herein.

The moisture permeability of the transparent polymer film of the invention is at least 100 g/(m²·day) as calculated in terms of the film having a thickness of 80 μm. The film having a moisture permeability of at least 100 g/(m²·day) as calculated in terms of the film having a thickness of 80 μm may be directly stuck to a polarizing film. The moisture permeability as calculated in terms of the film having a thickness of 80 μm is preferably from 100 to 1500 g/(m²·day), more preferably from 300 to 1000 g/(m²·day), even more preferably from 400 to 800 g/(m²·day).

In case where the transparent polymer film of the invention is used as an outer protective film not sandwiched between a polarizing film and a liquid crystal cell as described hereunder, then the moisture permeability of the transparent polymer film of the invention is preferably smaller than 500 g/(m²·day) as calculated in terms of the film having a thickness of 80 μm, more preferably from 50 to 450 g/(m²·day), even more preferably from 100 to 400 g/(m²·day), most preferably from 150 to 300 g/(m²·day). Thus designed, the resistance of the polarizer to moisture or wet heat is improved, and a liquid crystal display device of high reliability can be thereby provided.

[Transparent Polymer Film]

In the invention, the transparent polymer film comprises the polymer described hereunder as a constitutive element and has a light transmittance of at least 87% and a haze of at most 3%. The light transmittance of the transparent polymer is preferably at least 90%, more preferably at least 92%, still more preferably at least 93%. The light transmittance of the film is measured, after conditioned at 25° C. and at a relative humidity of 60% for 24 hours, with a color-difference/turbidity meter (COH-300A, by Nippon Denshoku Kogyo).

[Haze]

In the invention, the haze of the transparent polymer film is measured, after conditioned at 25° C. and at a relative humidity of 60% for 24 hours, with a haze meter (NDH 2000, by Nippon Denshoku Kogyo) Preferably, the haze of the transparent polymer film of the invention is at most 3%, more preferably from 0.0% to 2.0%, even more preferably from 0.1% to 1.0%, most preferably from 0.1% to 0.5%. Having a haze of at most 3%, the film is favorable as an optical film with no clear whitening appearance in visual observation.

[Tg]

20 mg of a sample is put into a DSC pan, and this is heated from 30° C. up to 250° C. in a nitrogen atmosphere at 10° C./min, and then cooled down to 30° C. at −20° C./min. Next, this is again heated from 30° C. up to 250° C., and the temperature at which the base line begins to deviate from the low-temperature side is referred to as Tg of the film.

[Polymer]

The polymer that is the constitutive element of the transparent polymer film of the invention includes cellulose ester, polyester, polycarbonate, cyclo-olefin polymer, vinyl polymer, polyamide and polyimide. Preferably, the polymer has a hydrophilic structure such as a hydroxyl group, an amido group, an imido group or an ester group in the backbone chain or the side branches thereof in order to attain a suitable moisture permeability. For the polymer, preferred is cellulose ester.

The polymer may be powdery or granular, or may be pelletized.

Preferably, the water content of the polymer is at most 1.0% by mass, more preferably at most 0.7% by mass, most preferably at most 0.5% by mass. As the case may be, the water content may be preferably at most 0.2% by mass. In case where the water content of the polymer is outside the preferred range, then it is desirable that the polymer is dried by heating before use.

One or more such polymers may be used herein either singly or as combined.

The cellulose ester includes cellulose ester compounds, and compounds having an ester-substituted cellulose skeleton that are obtained by biologically or chemically introducing a functional group into a starting material, cellulose. Of those, especially preferred is cellulose acylate.

Cellulose acylate is preferably used for the main component polymer of the transparent polymer film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose ester is an ester of cellulose with an acid. The acid to constitute the ester is preferably an organic acid, more preferably a carboxylic acid, even more preferably a fatty acid having from 2 to 22 carbon atoms, most preferably a lower fatty acid having from 2 to 4 carbon atoms.

The cellulose acylate is an ester of cellulose with a carboxylic acid. In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl, cinnamoyl, most preferably acetyl, propionyl, butyryl.

The cellulose ester may be an ester of cellulose with different acids. The cellulose acylate may be substituted with different acyl groups.

Preferably, the substitution degree of acyl group of the cellulose acylate is from 2.50 to 3.00, more preferably from 2.70 to 2.99, even more preferably from 2.80 to 2.98, most preferably from 2.90 to 2.98.

For the transparent polymer film of the invention, cellulose acetate, a type of cellulose acylate having an ester with acetic acid is especially preferred. From the viewpoint of the solubility thereof in solvent, more preferred is cellulose acetate having a substitution degree of acetyl group of from 2.70 to 2.87, and most preferred is cellulose acetate having from 2.80 to 2.86.

Regarding a method for producing cellulose acylate, its basic principle is described in *Wood Chemistry* by Nobuhiko Migita et al., pp. 180-190 (Kyoritsu Publishing, 1968). One typical method for producing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is from 150 to 500 as the viscosity-average polymerization degree thereof, more preferably from 200 to 400, even more preferably from 220 to 350. The viscosity-average polymerization degree may be measured according to a limiting viscosity method by Uda et al. (Kazuo Uda, Hideo Saito; *Journal of the Fiber Society of Japan*, Vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (high polymerization degree), but its viscosity may be lower than that of ordinary cellulose acylate. Such cellulose acylate where the amount of low-molecular components is small may be obtained by removing low-molecular components from cellulose acylate produced in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be from 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be produced.

The starting material, cotton for cellulose ester and methods for producing it are described also in Hatsumei Kyokai Disclosure Bulletin (No. 2001-1745, issued Mar. 15, 2001, Hatsumei Kyokai), pp. 7-12.

[Production of Transparent Polymer Film]

The transparent polymer film of the invention may be produced from a polymer solution that contains polymer and various additives, according to a method of solution casting film formation. In case where the melting point of the polymer of the invention or the melting point of a mixture of the polymer with various additives is lower than the decomposition temperature thereof and is higher than the stretching temperature thereof, then the polymer film may also be produced according to a method of melt film formation. The transparent polymer film of the invention may be produced according to such a method of melt film formation, and the method of melt film formation is described in JP-A-2000-352620.

[Polymer Solution]

(Solvent)

The transparent polymer film of the invention may be produced, for example, according to a method of solution casting film formation where a polymer solution that contains a polymer and optionally various additives is cast into a film.

The main solvent of the polymer solution (preferably, cellulose ester solution) to be used in producing the transparent polymer film of the invention is preferably an organic solvent that is a good solvent for the polymer. The organic solvent of the type is preferably one having a boiling point of not higher than 80° C. from the viewpoint of reducing the load in drying. More preferably, the organic solvent has a boiling point of from 10 to 80° C., even more preferably from 20 to 60° C. As the case may be, an organic solvent having a boiling point of from 30 to 45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the polymer solution (preferably, cellulose ester solution) to be used in producing the transparent polymer film of the invention, when the solvent of the solution is a single solvent, then it is the main solvent, but when the solvent is a mixed solvent of different solvents, then the main solvent is the solvent having the highest mass fraction of all the constitutive solvents.

The halogenohydrocarbon is preferably a chlorohydrocarbon, including dichloromethane and chloroform, and dichloromethane is more preferred.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be combined with the main solvent includes halogenohydrocarbons, esters, ketones, ethers, alcohols and hydrocarbons, which may have a branched structure or a cyclic structure. The organic solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol.

The hydrocarbon includes, for example, n-pentane, cyclohexane, n-hexane, benzene, toluene, xylene.

The organic solvent having two or more different types of functional groups includes, for example, 2-ethoxyethyl acetate, 2-methoxyethanol, 2-butoxyethanol, methyl acetacetate.

In case where the polymer that constitutes the transparent polymer film of the invention includes cellulose acylate, then it is desirable that the total solvent for it contains from 5% to 30% by mass, more preferably from 7% to 25% by mass, even more preferably from 10% to 20% by mass of alcohol from the viewpoint of reducing the load for film peeling from band.

In addition, from the viewpoint of Rth reduction, the polymer solution to be used for producing the transparent polymer film of the invention is preferably so designed that the content of the organic solvent therein which has a boiling point of 95° C. or higher and is not therefore so much evaporated away along with halogenohydrocarbon in the initial drying stage but is gradually concentrated therein, or that is, the content of such a bad solvent for cellulose ester is from 1% to 15% by mass, more preferably from 1.5% to 13% by mass, even more preferably from 2% to 10% by mass.

Preferred examples of the combination of organic solvents for use as the solvent in the polymer solution to be used in producing the transparent polymer film of the invention are mentioned below, to which, however, the invention should not be limited. The numerical data for ratio are parts by mass.

(1) Dichloromethane/methanol/ethanol/butanol=80/10/5/5
(2) Dichloromethane/methanol/ethanol/butanol=80/5/5/10
(3) Dichloromethane/isobutyl alcohol=90/10
(4) Dichloromethane/acetone/methanol/propanol=80/5/5/10
(5) Dichloromethane/methanol/butanol/cyclohexane=80/8/10/2
(6) Dichloromethane/methyl ethyl ketone/methanol/butanol=80/5/5/10
(7) Dichloromethane/butanol=90/10
(8) Dichloromethane/acetone/methyl ethyl ketone/ethanol/butanol=68/10/10/7/5
(9) Dichloromethane/cyclopentanone/methanol/pentanol=80/2/15/3
(10) Dichloromethane/methyl acetate/ethanol/butanol=70/12/15/3
(11) Dichloromethane/methyl ethyl ketone/methanol/butanol=80/5/5/10
(12) Dichloromethane/methyl ethyl ketone/acetone/methanol/pentanol=50/20/15/5/10
(13) Dichloromethane/1,3-dioxolan/methanol/butanol=70/15/5/10
(14) Dichloromethane/dioxane/acetone/methanol/butanol=75/5/10/5/5
(15) Dichloromethane/acetone/cyclopentanone/ethanol/isobutyl alcohol/cyclohexanone=60/18/3/10/7/2
(16) Dichloromethane/methyl ethyl ketone/acetone/isobutyl alcohol=70/10/10/10
(17) Dichloromethane/acetone/ethyl acetate/butanol/hexane=69/10/10/10/1
(18) Dichloromethane/methyl acetate/methanol/isobutyl alcohol=65/15/10/10
(19) Dichloromethane/cyclopentanone/ethanol/butanol=85/7/3/5
(20) Dichloromethane/methanol/butanol=83/15/2
(21) Dichloromethane=100
(22) Acetone/ethanol/butanol=80/15/5
(23) Methyl acetate/acetone/methanol/butanol=75/10/10/5
(24) 1,3-dioxolan=100
(25) Dichloromethane/methanol=85/15
(26) Dichloromethane/methanol=92/8
(27) Dichloromethane/methanol=90/10
(28) Dichloromethane/methanol=87/13
(29) Dichloromethane/ethanol=90/10

A detailed description of a case where a non-halogen organic solvent is the main solvent is given in Hatsumei Kyokai Disclosure Bulletin (No. 2001-1745, issued Mar. 15, 2001, Hatsumei Kyokai), which may be conveniently referred to herein.

(Solution Concentration)

The polymer concentration in the polymer solution to be prepared herein is preferably from 5% to 40% by mass, more preferably from 10% to 30% by mass, most preferably from 15% to 30% by mass.

The polymer concentration may be so controlled that it could be a predetermined concentration in the stage where polymer is dissolved in solvent. Apart from it, a solution having a low concentration (e.g., from 4% to 14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The polymer solution to be used for producing the transparent polymer film of the invention may contain various liquid or solid additives in accordance with the use of the film, in the steps of producing it. Examples of the additives are plasticizer (its preferred amount is from 0.01% to 10% by mass of the polymer—the same shall apply hereunder), UV absorbent (0.001% to 1% by mass), powdery particles having a mean particle size of from 5 to 3000 nm (0.001% to 1% by mass), fluorine-containing surfactant (0.001% to 1% by mass), release agent (0.0001% to 1% by mass), antioxidant (0.0001% to 1% by mass), optical anisotropy-controlling agent (0.01% to 10% by mass), IR absorbent (0.001% to 1% by mass).

The plasticizer and the optical anisotropy-controlling agent are organic compounds having a molecular weight of at most 3000, preferably those having both a hydrophilic part and a hydrophobic part. These compounds are aligned between the polymer chains, therefore changing the retardation of the polymer film. Combined with cellulose acylate that is especially preferably used in the invention, these compounds may improve the hydrophobicity of the polymer film and may reduce the moisture-dependent change of the retardation thereof. When combined with the above-mentioned UV absorbent or IR absorbent, they may effectively control the wavelength dependence of the retardation of the polymer film. The additives to be used in the transparent polymer film of the invention are preferably those not substantially evaporating in the step of drying the film.

From the viewpoint of reducing the moisture-dependent retardation change of the film, the amount of these additives to be added to the polymer film is preferably larger, but with the increase in the amount, there may occur some problems in that the glass transition temperature (Tg) of the film may lower and the additives may evaporate away during the process of film formation. Accordingly, in case where cellulose acetate which is preferred in the invention is used as the polymer, then the amount of the additives having a molecular weight of at most 3000 is preferably from 0.01% to 30% by mass, more preferably from 2% to 30% by mass, even more preferably from 5% to 20% by mass relative to the polymer.

A plasticizer preferred for the case where cellulose acylate is used as the polymer to constitute the transparent polymer film of the invention is described in JP-A-2001-151901. IR absorbent is described in JP-A-2001-194522. The time for additive addition may be determined depending on the type of the additive. The above-mentioned additives are described also in Hatsumei Kyokai Disclosure Bulletin (No. 2001-1745, issued Mar. 15, 2001, Hatsumei Kyokai), pp. 16-22.

(Preparation of Polymer Solution)

The polymer solution may be prepared, for example, according to the methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A-2000-273239. Concretely, polymer and solvent are mixed and stirred so that the polymer is swollen, and as the case may be, this is cooled or heated so as to dissolve the polymer, and thereafter this is filtered to obtain a polymer solution.

[Casting, Drying]

The transparent polymer film of the invention may be produced according to a conventional method of solution casting film formation, using a conventional apparatus for solution casting film formation. Concretely, a dope (polymer solution) prepared in a dissolver (tank) is filtered, and then once stored in a storage tank in which the dope is degassed to be a final dope. The dope is kept at 30° C., and fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die (casting step). Next, at a peeling point at which the metal support reaches almost after having traveled round the drum, a semi-dried dope film (this may be referred to as a web) is peeled from the metal support, and then transported to a drying zone in which the web is dried while conveyed with rolls therein. In this invention, the metal support is preferably a metal belt.

The remaining solvent content of the thus-dried film is preferably from 0% to 2% by mass, more preferably from 0% to 1% by mass. After dried, the film may be directly transported to a heating zone; or after once wound up, it may be heat-treated in an off-line process. Preferably, the width of the transparent polymer film before the heat treatment is from 0.5 to 5 m, more preferably from 0.7 t 3 m. In case where the film is once wound up, then the length of the film to be wound up is preferably from 300 to 30000 m, more preferably from 500 to 10000 m, even more preferably from 1000 to 7000 m.

[Heat Treatment]

In this invention, the formed transparent polymer film is heat-treated for attaining the intended Re and Rth. For obtaining a transparent polymer film which has the defined Re and Rth and of which the fluctuation in the retardation and the slow axis direction is small, it is extremely important to control the temperature and the draw ratio in the heat-treatment step. When the film is heat-treated under a suitably-controlled condition, then the polymer aggregation and alignment state therein can be suitably controlled and therefore the film may have the intended optical properties. Preferably, the birefringence of the film is reversed before and after the heat-treatment step.

(Temperature)

The production method of the invention comprises a heat-treatment step of transporting the transparent polymer film and heating it at (Tg+60)° C. or higher. More preferably, the heat-treatment temperature is from (Tg+65) to (Tg+150)° C., even more preferably from (Tg+70) to (Tg+100)° C. In case where the main component, polymer of the polymer film is cellulose acylate, then the temperature is 200° C. or higher, preferably from 210 to 270° C., more preferably from 220 to 250° C. As heat-treated at the thus-controlled temperature, the transparent polymer film of the invention may have a large Re and a negative Rth which conventional films could hardly have.

[Stretching]

For controlling its Re and Rth, it is also desirable that the transparent polymer film running in the heat-treatment zone is stretched.

(Stretching Method)

The stretching may be attained by holding both ends of the film with chucks and expanding it in the direction perpendicular to the machine direction (lateral stretching); but preferably, the film is stretched in the machine direction. For example, it is desirable that the film is longitudinally stretched (zone-stretched) in an apparatus having a heating zone between at least 2 nip rolls of which the peripheral speed of those on the take-out port side is kept higher. The draw ratio for stretching may be suitably defined depending on the necessary retardation of the film, and is preferably from 3% to 500%, more preferably from 5 to 100%, even more preferably from 10% to 80%, still more preferably from 20% to 60%. The stretching may be effected in one stage or in multiple stages. The "draw ratio (%)" as referred to is obtained according to the following formula:

$$\text{Draw Ratio}(\%) = 100 \times \{(\text{length after stretched}) - (\text{length before stretched})\}/(\text{length before stretched}).$$

The stretching speed is preferably from 10 to 10000%/min, more preferably from 20 to 1000%/min, even more preferably from 30 to 800%/min.

Preferably, the transparent polymer film of the invention has a single-layered structure and satisfies the intended properties of the invention. The single-layered transparent polymer film of the invention may have various functional parts formed therein, such as an optically-anisotropy part, an anti-glare part, a gas-barrier part, a moisture-resistant part. The "single-layered structure" as referred to herein means that the film is not formed of plural sheets of polymer film stuck together, but is a one-sheet polymer film. The single-layered film therefore includes an embodiment of producing such a one-sheet polymer film from different polymer solutions in a successive casting system or a co-casting system. In this embodiment, the type of the additives to be used and their blend ratio as well as the molecular weight distribution of the polymer and the type thereof may be suitably controlled or varied, and a polymer film having a distribution in the thickness direction thereof may be obtained. The matter as to whether the film has a single-layered structure or not may be judged by observing the cross section of the film with an electronic microscope.

[Surface Treatment]

The transparent polymer film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred.

The "glow discharge treatment" as referred to herein is a plasma treatment of treating a film surface in the presence of a plasma-exciting vapor. The details of the surface treatment are described in Hatsumei Kyokai Disclosure Bulletin (No. 2001-1745, issued Mar. 15, 2001, Hatsumei Kyokai), and may be conveniently referred to herein.

For improving the adhesiveness between the film surface of the transparent polymer film of the invention and a functional layer to be formed thereon, an undercoat layer (adhesive layer) may be formed on the film in place of or in addition to the surface treatment as above. The undercoat layer is described in Hatsumei Kyokai Disclosure Bulletin (No. 2001-1745, issued Mar. 15, 2001, Hatsumei Kyokai), page 32, which may be conveniently referred to herein. Functional layers that may be formed on the transparent polymer film of the invention are described in Hatsumei Kyokai Disclosure Bulletin (No. 2001-1745, issued Mar. 15, 2001, Hatsumei Kyokai), pp. 32-45, which may be conveniently referred to herein.

<<Retardation Film>>

The transparent polymer film of the invention may be used as a retardation film. "Retardation film" means an optical material that is generally used in display devices such as liquid crystal display devices and has optical anisotropy, and its meaning may be the same as that of retarder, optical compensatory film, optical compensatory sheet. In a liquid crystal display device, the retardation film is used for the purpose of increasing the contrast of the display panel and improving the viewing angle characteristic and the coloration thereof.

Using the transparent polymer film of the invention makes it easy to produce a retardation film of which Re and Rth can be controlled in any desired manner. For example, as a retardation film of which the retardation does not change dependently of the inclination angle to the slow axis direction, a film that satisfies Re≧30 nm and |Rth|≦15 nm can be favorably produced; and a film that satisfies Re≧50 nm and |Rth|≦10 nm can be produced more favorably.

The transparent polymer film of the invention may be used as a retardation film directly as it is. Plural sheets of the transparent polymer film of the invention may be laminated, or the transparent polymer film of invention may be laminated with any other film not falling within the scope of the invention, and the resulting laminate films thus having suitably controlled Re and Rth may also be used as retardation films. For laminating the films, a paste or an adhesive may be used.

As the case may be, the transparent polymer film of the invention may be used as a support of retardation films. An optically anisotropic layer of liquid crystal may be provided on the support to give a retardation film. The optical-anisotropic layer applicable to the retardation film of the invention may be formed of, for example, a composition containing a liquid crystalline compound or a polymer film having birefringence.

The liquid crystalline compound is preferably a discotic liquid crystalline compound or a rod-shaped liquid crystalline compound.

[Discotic Liquid Crystalline Compound]

Examples of the discotic liquid crystalline compound usable in the invention are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm., page* 1794 (1985); J. Zhang et al., *J. Am. Chem. Soc.*, Vol. 116, page 2655 (1994)).

Preferably, the discotic liquid crystalline molecules are fixed as aligned in the optically anisotropic layer; and most preferably, they are fixed through polymerization. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-shaped Liquid Crystalline Compound]

Examples of the rod-shaped liquid crystalline compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization. Examples of the polymerizing rod-shaped liquid crystalline compound usable in the invention are described, for example, in *Macromol. Chem.*, Vol. 190, page 2255 (1989); *Advanced materials*, Vol. 5, page 107 (1993); U.S. Pat. No. 4,683,327, U.S. Pat. No. 5,622,648, U.S. Pat. No. 5,770,107; WO95/22586, WO95/24455, WO97/00600, WO98/23580, WO98/52905; JP-A-1-272551, JP-A-6-16616, JP-A-7-110469, JP-A-11-80081 and JP-A-2001-328973.

(Optically Anisotropic Layer of Polymer Film)

The optically anisotropic layer may be formed of a polymer film. The polymer film may be made of a polymer capable of expressing optical anisotropy. Examples of the polymer capable of expressing optical anisotropy are polyolefins (e.g., polyethylene, polypropylene, norbornenic polymer), polycarbonates, polyarylates, polysulfones, polyvinyl alcohols, polymethacrylates, polyacrylates, and cellulose esters (e.g., cellulose triacetate, cellulose diacetate). The polymer may be a copolymer or a polymer mixture of these polymers.

<<Polarizer>>

The transparent polymer film or the retardation film of the invention may be used as a protective film of a polarizer (polarizer of the invention). The polarizer of the invention comprises a polarizing film and two polarizer-protective films (transparent polymer films) that protect both surfaces of the film, in which the transparent polymer film or the retardation film of the invention may be used as at least one of the polarizer-protective films.

In case where the transparent polymer film of the invention is used as the polarizer-protective film, then it is desirable that the transparent polymer film of the invention is subjected to the above-mentioned surface treatment (described also in JP-A-6-94915, JP-A-6-118232) for hydrophilication. For example, the film is preferably subjected to glow discharge treatment, corona discharge treatment or alkali saponification treatment. In particular, when the polymer to constitute the transparent polymer film of the invention is cellulose acylate, then the surface treatment is most preferably alkali saponification treatment.

For the polarizing film, for example, herein usable is a polyvinyl alcohol film dipped and stretched in an iodine solution. In case where such a polyvinyl alcohol dipped and stretched in an iodine solution is used as the polarizing film, then the treated surface of the transparent polymer film of the invention may be directly stuck to both surfaces of the polarizing film with an adhesive. In the production method of the invention, it is desirable that the transparent polymer film is directly stuck to the polarizing film in that manner. The adhesive may be an aqueous solution of polyvinyl alcohol or polyvinyl acetal (e.g., polyvinyl butyral), or a latex of vinylic polymer (e.g., polybutyl acrylate). An especially preferred example of the adhesive is an aqueous solution of completely-saponified polyvinyl alcohol.

In a liquid crystal display device, in general, a liquid crystal cell is provided between two polarizers, and therefore, the device has four polarizer-protective films. The transparent polymer film of the invention may be used as any of the four polarizer-protective films. Especially advantageously in such a liquid crystal display device, the transparent polymer film of the invention is used as the protective film to be disposed between the polarizing film and the liquid crystal layer (liquid crystal cell). On the protective film to be disposed on the opposite side to the transparent polymer film of the invention via the polarizing film therebetween, optionally provided is a transparent hard-coat layer, an antiglare layer or an antireflection layer. In particular, the film of the invention is favorably used as the polarizer-protective film on the outermost side of the display panel of a liquid crystal display device.

<<Liquid Crystal Display Device>>

The transparent polymer film, the retardation film and the polarizer of the invention may be used in liquid crystal display devices of various display modes. Liquid crystal display modes to which the films are applicable are described below. Of those modes, the transparent polymer film, the retardation film and the polarizer of the invention are favorably used in liquid crystal display devices of VA mode and IPS mode. The liquid crystal display devices may be any of transmission type, reflection type or semi-transmission type.

(TN-Type Liquid Crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The retardation film to be used in TN-type liquid crystal display devices is described in JP-A-3-9325, JP-A-6-148429, JP-A-8-50206, JP-A-9-26572; and Mori et al's reports (*Jpn. J. Appl. Phys.*, Vol. 36 (1997), p. 143; *Jpn. J. Appl. Phys.*, Vol. 36 (1997), p. 1068).

(STN-Type Liquid Crystal Display Device)

The transparent polymer film of the invention may be used as a support of the retardation film in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product ($\Delta$nd) of the refractive anisotropy ($\Delta$n) of the rod-shaped liquid crystalline molecule and the cell gap (d) is within a range of from 300 to 1500 nm. The retardation film to be used in STN-type liquid crystal display devices is described in JP-A-2000-105316.

(VA-Type Liquid Crystal Display Device)

The transparent polymer film of the invention is especially advantageously used as the retardation film or as a support of the retardation film in a VA-type liquid crystal display device having a VA-mode liquid crystal cell. The VA-type liquid crystal display device may be a multi-domain system, for example, as in JP-A-10-123576. In these embodiments, the polarizer that comprises the transparent polymer film of the invention contributes to enlarging the viewing angle of the display panel and to improving the contrast thereof.

(IPS-Type Liquid Crystal Display Device and ECB-Type Liquid Crystal Display Device)

The transparent polymer film of the invention is especially advantageously used as the retardation film, as a support of the retardation film or as a protective film of the polarizer in an IPS-type liquid crystal display device and an ECB-type liquid crystal display device having an IPS-mode or ECB-mode liquid crystal cell. In the devices of these modes, the liquid crystal material is aligned nearly in parallel in black display, or that is, the liquid crystal molecules are aligned in parallel to the substrate face while no voltage is applied thereto, thereby giving black display. In these embodiments, the polarizer that comprises the transparent polymer film of the invention contributes to enlarging the viewing angle of the display panel and to improving the contrast thereof.

(OCB-Type Liquid crystal Display Device and HAN-Type Liquid Crystal Display Device)

The transparent polymer film of the invention is also especially advantageously used as a support of the retardation film in an OCB-type liquid crystal display device having an OCB-mode liquid crystal cell and in a HAN-type liquid crystal display device having a HAN-mode liquid crystal cell. The retardation film to be used in an OCB-type liquid crystal display device and a HAN-type liquid crystal display device is preferably so designed that the direction in which the absolute value of the retardation of the film is the smallest does not exist both in the in-plane direction of the retardation film and in the normal direction thereof. The optical properties of the retardation film to be used in an OCB-type liquid crystal display device and a HAN-type liquid crystal display device may vary depending on the optical properties of the optically anisotropic layer therein, the optical properties of the support therein and the relative positioning of the optically anisotropic layer and the support therein. The retardation film to be used in an OCB-type liquid crystal display device and a HAN-type liquid crystal display device is described in JP-A-9-197397. It is described also in a Mori et al's report (*Jpn. J. Appl. Phys.*, Vol. 38 (1999), p. 2837).

(Reflection-Type Liquid Crystal Display Device)

The transparent polymer film of the invention may be advantageously used also as the retardation film in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO98/48320, Japanese Patent 3022477. The retardation film for use in reflection-type liquid crystal display devices is described in WO00/65384.

(Other Liquid Crystal Display Devices)

The transparent polymer film of the invention may be advantageously used also as a support of the retardation film in an ASM (axially symmetric aligned microcell)-type liquid crystal display device having an ASM-mode liquid crystal cell. The ASM-mode liquid crystal cell is characterized in that the cell thickness is held by a position-adjustable resin spacer.

The other properties of the cell are the same as those of the TN-mode liquid crystal cell. The ASM-mode liquid crystal cell and the ASM-type liquid crystal display device are described in a Kume et al's report (Kume et al., SID 98 Digest 1089 (1988)).
(Hard Coat Film, Antiglare Film, Antireflection Film)

As the case may be, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments of such antiglare film and antireflection film are described in detail in Hatsumei Kyokai Disclosure Bulletin (No. 2001-1745, issued Mar. 15, 2001, Hatsumei Kyokai), pp. 54-57, and are preferably employed also for the transparent polymer film of the invention.

EXAMPLES

<<Methods for Measurement>>

Methods for measuring and evaluating the characteristics as referred to in the following Examples are described.
[Retardation]

Samples of 5 cm×5 cm are cut out from a film to be analyzed, and tested according to the methods mentioned above. The data at different points are averaged to obtain Re and Rth, the slow axis direction, the fluctuation in Re and Rth, and the fluctuation in the slow axis direction.
[Moisture Permeability]

The value determined according to the method mentioned above is calculated in terms of the film having a thickness of 80 μm.
[Tg]

The value determined according to the method mentioned above is Tg of the film analyzed.
[Polarization]

Two sheets of the polarizer produced herein are stuck together with their absorption axes kept in parallel to each other and the transmittance (Tp) thereof is measured; and they are stuck together with their absorption axes kept perpendicular to each other and the transmittance (Tc) thereof is measured. The polarization (P) of the polarizer is computed according to the following formula:

$$\text{Polarization, } P = ((Tp-Tc)/(Tp+Tc))^{0.5}$$

The characteristics of the invention are described more concretely with reference to the following Examples and Comparative Examples. In the following Examples, the material used, its amount and the ratio, the details of the treatment and the treatment process may be suitably modified or changed not overstepping the spirit and the scope of the invention. Accordingly, the invention should not be limitatively interpreted by the Examples mentioned below.

Examples 101 to 111, Comparative Examples 101 to 106

(Preparation of Polymer Solution)
1) Polymer:

In Examples and Comparative Examples, a polymer A mentioned below was used. The polymer A was heated and dried at 120° C. to have a reduced water content of at most 0.5% by mass, and 20 parts by mass of the polymer A was used herein.

Polymer A:

The polymer A is a powder of cellulose acetate having a substitution degree of 2.85. The viscosity-average polymerization degree of the polymer A was 300; the substitution degree of 6-acetyl group thereof was 0.89; the acetone extract fraction thereof was 7% by mass; the ratio of weight-average molecular weight/number-average molecular weight thereof was 2.3; the water content thereof was 0.2% by mass; the viscosity thereof in 6 mas. % dichloromethane solution was 305 mPa·s; the amount of the residual acetic acid therein was at most 0.1% by mass; the Ca content thereof was 65 ppm; the Mg content thereof was 26 ppm; the iron content thereof was 0.8 ppm; the sulfate ion content thereof was 18 ppm; the yellowness index thereof was 1.9; and the amount of free acetic acid therein was 47 ppm. The mean particle size of the powder was 1.5 mm, and the standard deviation thereof was 0.5 mm.
[Substitution Degree]

The substitution degree of acyl group of cellulose acylate is determined through $^{13}$C-NMR according to the method described in *Carbohydr. Res.* 273 (1995), 83-91 (by Tezuka, et al).
[Polymerization Degree]

The cellulose acylate produced herein is absolutely dried, then about 0.2 g thereof is accurately weighed, and dissolved in 100 mL of a mixed solvent of dichloromethane/ethanol=9/1 (by mass). Using an Ostwald viscometer, the time (second) taken by its dropping at 25° C. is counted, and the polymerization degree, DP of the polymer is calculated according to the following formulae:

$$\eta_{rel} = T/T_0$$

$$[\eta] = \ln(\eta_{rel})/C$$

$$DP = [\eta]/Km$$

wherein T indicates the time (second) taken by the dropping sample; $T_0$ indicates the time (second) taken by the dropping solvent alone; ln indicates a natural logarithm; C indicates the concentration (g/L); Km is $6 \times 10^{-4}$.
2) Solvent:

In Examples and Comparative Examples, a mixed solvent of dichloromethane/methanol/butanol (83/15/2 by mass) was used. The water content of the solvent was at most 0.2% by mass.
3) Additive:

Any of the following additive A or B was used in Examples and Comparative Examples, as in Table 1 below.
Additive A:
Silicon dioxide particles (particle size, 20 nm; Mohs' hardness, about 7) (0.08 parts by mass)
Additive B:
Triethylene glycol (2.4 parts by mass)
Silicon dioxide particles (particle size, 20 nm; Mohs' hardness, about 7) (0.08 parts by mass)
4) Swelling, Dissolution:

In Examples and Comparative Examples, the solvent and the additive mentioned above were put into a 400-liter stainless solution tank, which has stirring blades and is cooled with cooling water that runs around its periphery. With stirring and dispersing them therein, the polymer was gradually added to the tank. After the addition, this was stirred at room temperature for 2 hours. After thus swollen for 3 hours, this was again stirred to obtain a polymer solution.

For the stirring, used were a dissolver-type eccentric stirring shaft that runs at a peripheral speed of 15 m/sec (shear stress, $5 \times 10^4$ kgf/m/sec$^2$ [$4.9 \times 10^5$ N/m/sec$^2$]) and a stirring shaft that has an anchor blade at the center axis thereof and runs at a peripheral speed of 1 m/sec (shear stress, $1 \times 10^4$ kgf/m/sec$^2$ [$9.8 \times 10^4$ N/m/sec$^2$]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete solution. The heating time was 15 minutes. In this stage, the filter, the housing and the pipe line that are exposed to high temperature are all made of Hastelloy alloy of good corrosion resistance; and the system is covered with a jacket for heat carrier circulation therethrough for keeping the system warmed and heated.

Next, this was cooled to 36° C. to obtain a polymer solution.

5) Filtration:

The thus-obtained polymer solution was filtered through a paper filter sheet (#63, by Toyo Filter) having an absolute filtration accuracy of 10 μm, and then through a sintered metal filter sheet (FH025, by Paul) having an absolute filtration accuracy of 2.5 μm to obtain a polymer solution.

(Formation of Film)

The polymer solution was heated at 30° C., passed through a caster, Giesser (described in JP-A-11-314233), and cast onto a mirror-faced stainless support having a band length of 60 m and set at 15° C., at a casting speed of 50 m/min. The casting width was 200 cm. The space temperature in the entire casting zone was set at 15° C. At 50 cm before the endpoint of the casting zone, the polymer film thus cast and rolled was peeled off from the band, and exposed to drying air applied thereto at 45° C. Next, this was dried at 110° C. for 5 minutes and then at 140° C. for 10 minutes to obtain a transparent film of cellulose acylate.

(Heat Treatment)

Thus obtained, the transparent film was subjected to heat treatment with its machine direction fixed, using a roll stretcher. The rolls of the roll stretcher are mirror-finished induction-heating jacket rolls, and they are separately controlled for their temperature. The heat-treatment zone was covered with a casing, and its temperature was controlled as in Table 1. The rolls in the former part of the heat-treatment zone were so controlled that they could keep the heat-treatment temperature as in Table 1. The roll-to-roll distance was so controlled that the aspect ratio (length/width) could be 3.3, and the draw ratio was suitably defined by changing the peripheral speed of each roll before and after the heat-treatment zone. The stretching speed was 10%/min relative to the stretching distance. After stretched, the film was cooled and wound up. The draw ratio in stretching and the film thickness are given in Table 1.

In Table 1, "Tac A" is FUJITAC T80UZ (by Fuji Photo Film); "Tac C" is FUJITAC T40UZ (by Fuji Photo Film); and "Tac D" is FUJITAC TF80UL (by Fuji Photo Film).

(Evaluation of Transparent Polymer Film)

The obtained transparent polymer films were evaluated. The results are given in Table 1.

In Examples 101 to 111, the slow axis of Re of the film was seen in the cross direction; in Comparative Example 105, the slow axis of Re of the film was seen in the machine direction.

In all the samples of Examples 101 to 111 and Comparative Example 105, the fluctuation in Re and Rth was as follows: Re was within ±2 nm, and Rth was within ±5 nm. In these, the fluctuation in the slow axis direction was less than 2°.

[Surface Condition]

The surface of the obtained transparent polymer film was visually observed to evaluate the surface condition thereof according to the following criteria:

◯: The film surface condition is good, and the film is favorable for optical use.

X (1): The film was entirely whitened, and is unsuitable to optical use.

X (2): The film surface was significantly colored or waved, and it is unsuitable to optical use.

TABLE 1

| | | | Heat Treatment | | Film Thickness | | | Re | Rth | Moisture Permeability calculated in |
|---|---|---|---|---|---|---|---|---|---|---|
| | Type of Additive | Tg [° C.] | Temperature [° C.] | Draw Ratio [%] | before stretched [μm] | after stretched [μm] | Film Surface Condition | mean value [nm] | mean value [nm] | terms of 80 μm thick [g/m$^2$ · day] |
| Example 101 | Additive A | 150 | 200 | 30 | 90 | 101 | ◯ | 72 | −37 | 990 |
| Example 102 | Additive A | 150 | 220 | 30 | 90 | 109 | ◯ | 140 | −58 | 980 |
| Example 103 | Additive A | 150 | 220 | 20 | 90 | 113 | ◯ | 115 | −59 | 980 |
| Example 104 | Additive A | 150 | 240 | 30 | 90 | 120 | ◯ | 171 | −73 | 980 |
| Comp. Ex. 101 | Additive A | 150 | 180 | 30 | 90 | 90 | X (1) | — | — | — |
| Comp. Ex. 102 | Additive A | 150 | 300 | 30 | 90 | — | X (2) | — | — | — |
| Example 105 | Additive B | 130 | 200 | 30 | 85 | 104 | ◯ | 119 | −54 | 1000 |
| Example 106 | Additive B | 130 | 220 | 30 | 85 | 118 | ◯ | 191 | −83 | 990 |
| Example 107 | Additive B | 130 | 240 | 30 | 85 | 121 | ◯ | 211 | −83 | 980 |
| Comp. Ex. 103 | Additive B | 130 | 180 | 30 | 85 | 83 | X (1) | — | — | — |
| Example 108 | (Tac A) | 140 | 220 | 40 | 80 | 95 | ◯ | 43 | −25 | 420 |
| Example 109 | (Tac A) | 140 | 240 | 40 | 80 | 96 | ◯ | 71 | −41 | 410 |
| Example 110 | (Tac C) | 140 | 240 | 40 | 80 | 96 | ◯ | 73 | −41 | 410 |
| Example 111 | (Tac D) | 140 | 240 | 40 | 40 | 53 | ◯ | 59 | −24 | 740 |
| Comp. Ex. 104 | (Tac A) | 140 | 180 | 40 | 80 | 77 | X (1) | — | — | — |
| Comp. Ex. 105 | (Tac A) | 140 | 180 | 20 | 80 | 80 | ◯ | 21 | 32 | 430 |
| Comp. Ex. 106 | (Tac A) | 140 | 280 | 40 | 80 | — | X (2) | — | — | — |

As in Table 1, when heat-treated according to the method of the invention, the films produced may have a large Re and a negative Rth. As opposed to these, when the heat-treatment temperature was unsuitable, then the films were whitened, their Re was small, they could not have a negative Rth, and their controllable retardation range was narrowed.

Example 112

A film having Re=172 nm and Rth=−75 nm was obtained in the same manner as in Example 104, for which, however, the heat-treatment step in Example 104 was changed as follows:
(Heat Treatment)

The obtained transparent film was heat-treated, using an apparatus with a heating zone controlled at 240° C. between two nip rolls. The draw ratio was controlled to be 30% by controlling the peripheral speed of the nip rolls, and the aspect ratio (distance between nip rolls/base width) was controlled to be 3.3. After stretched, the film was cooled and wound up.

Comparative Example 107

A birefringent film was obtained according to Example 5 in JP-A-5-157911, using Tac A. The angle between the in-plane slow axis direction and the machine direction of the film was 3°, and was unfavorable. The fluctuation in the slow axis direction was 8° and was great; and the fluctuation in Re and Rth was also large, or that is, Re was ±25 nm and Rth was ±43 nm. In addition, the film was whitened.

Example 201

(Formation of Laminate Retardation Film)

The cellulose ester film of the invention can be directly used as it is, as a retardation film having a large Re and a negative Rth. In this, however, films were stuck to each other with an adhesive in a mode of roll-to-roll operation to produce a laminate retardation film having a controlled Rth/Re.

FUJITAC TD80UF (by Fuji Photo Film) was stuck to the film of Example 101 with an adhesive, in a mode of roll-to-roll operation, and Re and Rth of the resulting laminate film were measured according to the method mentioned above. As a result, Re=63 nm, Rth=3 nm. The slow axis of Re of the retardation film was seen in the cross direction of the film.

Examples 301 to 311, Comparative Examples 301 to 306

(Formation of Polarizer)

The obtained film was saponified and worked into polarizers.
1) Saponification of Film:

Film A and Film B shown in Table 2 below were dipped in an aqueous NaOH (1.5 mol/L) solution (saponifying solution) conditioned at 55° C., for 2 minutes, then washed with water, and thereafter dipped in an aqueous sulfuric acid (0.05 mol/L) solution for 30 seconds, and then further passed through a washing bath. Next, this was dewatered three times with an air knife to thereby remove water from it, and then this was dried by keeping it in a drying zone at 70° C. for 15 seconds to produce a saponified film.
2) Formation of Polarizing Layer:

According to Example 1 in JP-A-2001-141926, a film was stretched in the machine direction between two pair of nip rolls running at a different peripheral speed, thereby forming a polarizing layer having a thickness of 20 μm.
3) Sticking:

The thus-obtained polarizing layer was applied to two films selected from the above-mentioned saponified films (they are Film A, Film B, and their combination for each Example and each Comparative Example is shown in Table 2) in such a manner that the saponified surface of each film could face the polarizing layer and that the polarizing layer could be sandwiched between the two films, and these were stuck together with an adhesive, aqueous 3% solution of PVA (Kuraray's PVA-117H) in such a manner that the polarizing axis of the polarizing layer could be perpendicular to the machine direction of the films.

In Table 2 below, "Tac B" is Fujitac TD80UF (by Fuji Photo Film; having a permeability at 40° C. and at a relative humidity of 90% of 430 g/(m²·day) (as calculated in terms of the film having a thickness of 80 μm)); "Polycarbonate" is Panlite C1400 (by Teijin Chemical; having a permeability at 40° C. and at a relative humidity of 90% of 30 g/(m²·day) (as calculated in terms of the film having a thickness of 80 μm)); "COP1" is Arton Film (having a thickness of 80 μm, by JSR; and having a permeability at 40° C. and at a relative humidity of 90% of 30 g/(m²·day) (as calculated in terms of the film having a thickness of 80 μm)); "COP2" is Zeonoa Film (having a thickness of 100 μm, by Nippon Zeon; and having a permeability at 40° C. and at a relative humidity of 90% of 0 g/(m²·day) (as calculated in terms of the film having a thickness of 80 μm)).

In Comparative Example 304, the surface treatment of the films was changed to corona treatment for their sticking.
(Evaluation of Polarizer)
[Initial Polarization]

The polarization of the polarizers was measured according to the method mentioned above. The results are given in Table 2.
[Polarization 1 After Aging]

The side of the film A of the polarizer was stuck to a glass plate with an adhesive, and left at 60° C. and at a relative humidity of 95% for 500 hours. After thus left, the polarization (after aging) of the polarizer was measured according to the method mentioned above. The results are given in Table 2.
[Polarization 2 After Aging]

The side of the film A of the polarizer was stuck to a glass plate with an adhesive, and left at 90° C. and at a relative humidity of 0% for 500 hours. After thus left, the polarization (after aging) of the polarizer was measured according to the method mentioned above. The results are given in Table 2.

TABLE 2

|  | Film A | Film B | Initial Polarization [%] | Polarization 1 after aging [%] | Polarization 2 after aging [%] |
| --- | --- | --- | --- | --- | --- |
| Example 301 | Example 101 | Tac B | 99.9 | 99.9 | 99.9 |
| Example 302 | Example 102 | Tac B | 99.9 | 99.9 | 99.9 |
| Example 303 | Example 105 | Tac B | 99.9 | 99.9 | 99.9 |
| Example 304 | Example 106 | Tac B | 99.9 | 99.9 | 99.9 |

TABLE 2-continued

|  | Film A | Film B | Initial Polarization [%] | Polarization 1 after aging [%] | Polarization 2 after aging [%] |
|---|---|---|---|---|---|
| Example 305 | Example 105 | Tac B | 99.9 | 99.9 | 99.9 |
| Example 306 | Example 106 | Tac B | 99.9 | 99.9 | 99.9 |
| Example 307 | Example 108 | Tac B | 99.9 | 99.9 | 99.9 |
| Example 308 | Example 108 | Example 108 | 99.9 | 99.9 | 99.9 |
| Example 309 | Example 109 | Tac B | 99.9 | 99.9 | 99.9 |
| Example 310 | Example 110 | Tac B | 99.9 | 99.9 | 99.9 |
| Example 311 | Example 111 | Tac D | 99.9 | 99.9 | 99.9 |
| Comp. Ex. 301 | Polycarbonate | Polycarbonate | (Immeasurable as the sticking was insufficient.) | | |
| Comp. Ex. 302 | COP1 | COP1 | (Immeasurable as the sticking was insufficient.) | | |
| Comp. Ex. 303 | COP2 | COP2 | (Immeasurable as the sticking was insufficient.) | | |
| Comp. Ex. 304 | COP2 | COP2 | 99.9 | 99.9 | (foamed) |
| Comp. Ex. 305 | Comp. Ex. 105 | Tac B | 99.9 | 99.9 | 99.9 |
| Comp. Ex. 306 | Tac B | Tac B | 99.9 | 99.9 | 99.9 |

(Evaluation in Mounting on IPS-Type Liquid Crystal Display Device)

The polarizer of Examples 301 to 311 was built in an IPS-type liquid crystal display device (32V-size High-Definition Liquid crystal Television Monitor (W32-L7000) by Hitachi) in place of the polarizer originally built therein, and it improved the viewing angle characteristics of the device. As opposed to this, when the polarizer of Comparative Example 305 or 306 was built in the device, the viewing angle characteristics could not be improved or were improved insufficiently.

INDUSTRIAL APPLICABILITY

The invention provides a transparent polymer film which has a suitable moisture permeability and has a large Re and a negative Rth and of which the fluctuation in the retardation and the slow axis direction is small, therefore providing an excellent retardation film. Since the transparent polymer film of the invention has a suitable moisture permeability, it can be stuck to a polarizing film in on-line operation, therefore providing a polarizer of good visibility at high producibility. Further, the invention provides a liquid crystal display device of high reliability. Accordingly, the industrial applicability of the invention is good.

The invention claimed is:

1. A transparent polymer film satisfying the following formulae (I) and (II) and having a moisture permeability at 40° C. and a relative humidity of 90% of at least 100 g/(m²·day) as calculated in terms of the film having a thickness of 80 μm:

$$Re \geq 15 \quad (I):$$

$$Rth \leq -7.5 \quad (II):$$

wherein Re and Rth each indicates the in-plane and thickness-direction retardation (unit: nm), respectively, at a wavelength of 632.8 nm.

2. The transparent polymer film according to claim 1, which has a thickness of from 20 μm to 180 μm.

3. The transparent polymer film according to claim 1, which has a single-layered structure.

4. The transparent polymer film according to claim 1, wherein the polymer comprises cellulose acylate as a main component.

5. The transparent polymer film according to claim 4, wherein the cellulose acylate is cellulose acetate.

6. A retardation film comprising at least one transparent polymer film of claim 1.

7. A polarizer comprising at least one transparent polymer film of claim 1.

8. The polarizer according to claim 7, wherein the transparent polymer film is directly stuck to a polarizing film.

9. A method for producing a transparent polymer film, which comprises transporting a transparent polymer film having a moisture permeability at 40° C. and a relative humidity of 90% of at least 100 g/(m²·day) as calculated in terms of the film having a thickness of 80 μm, and heating it at (Tg+60)° C. or higher wherein Tg is a glass transition temperature of the polymer film.

10. The method for producing a transparent polymer film according to claim 9, wherein the cellulose acylate film is stretched during the heating.

11. The method for producing a transparent polymer film according to claim 10, wherein the stretching is machine-direction stretching to be attained in an apparatus having a heating zone between at least 2 nip rolls.

12. A liquid crystal display device comprising at least one transparent polymer film of claim 1.

13. The transparent polymer film according to claim 1, wherein the transparent polymer film satisfies the formula Rth≧−54.

14. The transparent polymer film according to claim 1, wherein the polymer comprises cellulose acylate.

* * * * *